United States Patent [19]

Mitsching et al.

[11] Patent Number: 4,641,510
[45] Date of Patent: Feb. 10, 1987

[54] ELECTROMAGNETICALLY OPERATED PEENING TOOL

[75] Inventors: Rainer Mitsching, Mehring; Heinz Nennstiel, Koenigsbrunn, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 791,790

[22] Filed: Oct. 28, 1985

[30] Foreign Application Priority Data

Nov. 17, 1984 [DE] Fed. Rep. of Germany ....... 3442089

[51] Int. Cl.$^4$ ............................................. B21J 7/16
[52] U.S. Cl. ......................................... 72/53; 72/430
[58] Field of Search ................................. 72/430, 53

[56] References Cited

U.S. PATENT DOCUMENTS 3,937,055 2/1976 Caruso et al. ............................ 72/53

FOREIGN PATENT DOCUMENTS 3140114 6/1980 Fed. Rep. of Germany .
2947144 6/1982 Fed. Rep. of Germany .
456704 1/1975 U.S.S.R. .................................... 72/53

Primary Examiner—W. D. Bray
Attorney, Agent, or Firm—W. G. Fasse; D. H. Kane, Jr.

[57] ABSTRACT

Work piece surfaces are peened by electromagetically controlled steel needles which are guided for back and forth sliding movement in a guide plate. Each needle has its own electrically controllable drive magnet. All the magnets are energized in a controlled sequence by a control unit which energizes the drive magnets in a given sequence or pattern and in accordance with adjustable parameters such as the stroke amplitude and frequency of each needle stroke. Thus, the work piece may be deformed into a particular shape and/or its surface may be work hardened or densified and areas of different surface stress may be produced in the work piece surface. Work pieces may be shaped into any desired three-dimensional curvature.

12 Claims, 6 Drawing Figures

ELECTROMAGNETICALLY OPERATED PEENING TOOL

FIELD OF THE INVENTION

The invention relates to an electromagnetically operated peening tool. More specifically, the present tool is constructed for work hardening and/or densifying the surface of a work piece and for producing surface stress in the work piece, whereby areas of different surface stresses may be produced.

DESCRIPTION OF THE PRIOR ART

Heretofore, the production of mechanical surface stresses in the surface of a work piece has been done by so-called ball peening involving the impingement of the work piece surface by a plurality of hard steel balls carried in a forceful gas jet. This method has the advantage that as a result of the impacting of the work piece surface by the steel balls, the work piece surface is densified in its outer zone so that the metal can take up a higher tension stress when the work piece is subjected to a bending load. However, this known method also has a disadvantage in that the peening balls are subject to a relatively rapid wear so that the ball diameter changes rapidly. This diameter change of the peening balls prevents an exact control of the blasting parameters. Further, shaping of sheet metal to any desired curvature is not readily possible with prior ball blasting methods.

It is also known from German Patent Publication (DE-OS) No. 2,947,144 to work harden a metal surface by applying pressure impulses derived from an electromagnetic field, which drives a peening tool comprising a spring to which a ball is secured. The ball is located inside an electromagnet which is connected to an alternating current source. German Patent Publication No. 2,947,144 also suggests to work harden a work piece by the application of impulses of an electromagnetic field to cause a pressure impulse on the work piece.

German Patent Publication (DE-OS) No. 3,140,114 discloses a method for ball peening or ball blasting the surfaces of metal pieces in such a way that the applied compression of a predetermined size results in a desired permanent stress due to work hardening.

In all these prior art teachings the sheet metal surface area is increased due to the ball peening, whereby the material of the sheet metal is curved in the direction toward the ball or in the direction of the ball carrier. Thus, prior art methods are limited to producing cylindrical shapes with the aid of ball peening. However, it is not possible to produce sheet metal surfaces having any desired, especially three-dimensional, curvature.

OBJECTS OF THE INVENTION

In view of the above it is the aim of the invention to achieve the following objects singly or in combination:

to precisely control each impacting point not only with a defined ball diameter, but also with a defined pressure;

to construct a peening tool in such a manner that the impact force, the impact stroke length, and the impact frequency is precisely controllable for a plurality of peening tools in the form of peening needles; and to provide a peening tool with the aid of which it will be possible to shape sheet metal to any desired curvature including a three-dimensional curvature.

SUMMARY OF THE INVENTION

The peening tool according to the invention is characterized in that a plurality of steel peening needles are guided in a guide unit in a plurality of guide holes, whereby each steel peening needle has a tool end projecting from the guide unit for performing the work stroke. Each tool end may have the required shape. The opposite end of each peening needle inside the tool has an armature, preferably a cylindrical armature, cooperating with a magnetic coil guide system which guides and drives the respective magnetic armature in a back and forth movement for the controlled peening operation.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
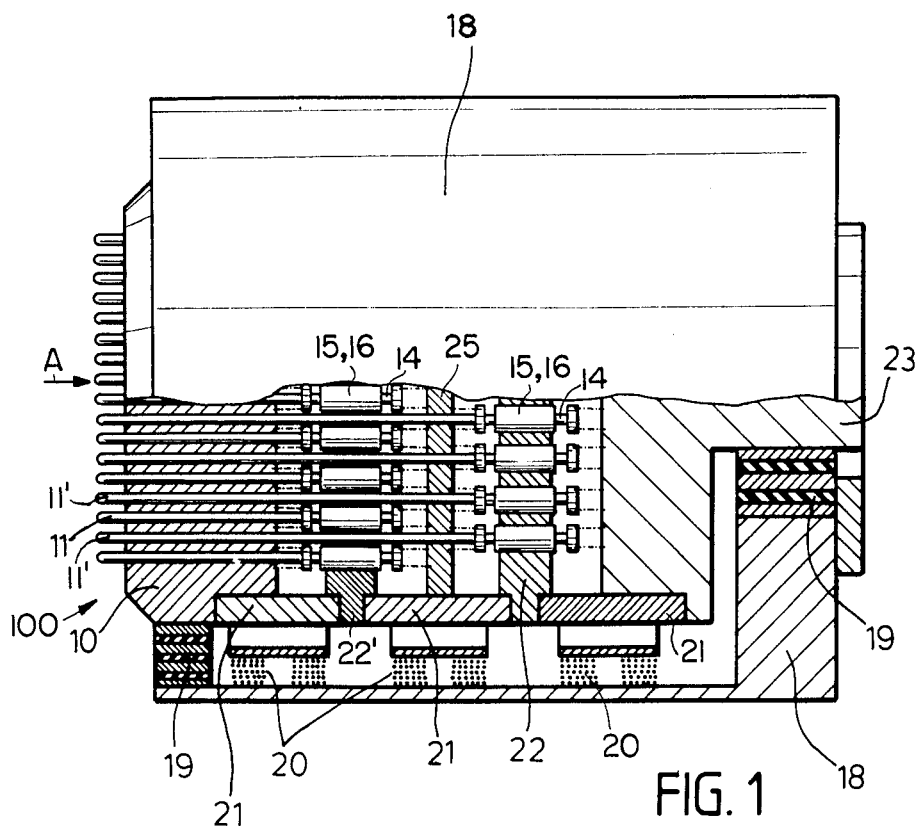
FIG. 1 shows a side view, partially in section, of the peening tool according to the invention.

FIG. 1 shows the present peening tool in which a needle carrier and guide unit 100 is supported in a housing 18 by flexibly yielding elastomeric bearings 19. As shown, there are two sets of peening needles 11 and 11'. The peening needles of the needle set 11 are shorter than the peening needles of the needle set 11', whereby it is possible to increase the number of needles supported in the guide and carrier unit 100. The guide and carrier unit 100 has a main guide plate 10 and a further guide plate 25. All the needles extend through guide holes 12 in the guide plate 10, but only the longer needles extend through the guide holes in the guide plate 25. Each needle is provided with an armature 14, preferably of cylindrical shape, slidable back and forth inside its respective electromagnetic drive coil 15 and inside its respective electromagnetic control coil 16 as will be described in more detail below with reference to FIG. 3. The electromagnetic coils 15, 16 for the short needles are supported by a carrier ring 22'. The respective electromagnetic coils 15 and 16 for the long needles are supported by a carrier ring 22. A backing plate 23 closes the carrier unit 100. Ferromagnetic rings 21 operatively interconnect the main guide plate 10, the two carrier rings 22 and 22', as well as the backing plate 23, thereby forming a cage type unit mounted in the housing 18 as mentioned above. Oscillating ring coils 20 are operatively arranged between the housing 18 and the cage type carrier and guide structure 100. The coils 20 cooperate with the ferromagnetic rings 21 in oscillating the cage type unit 100 back and forth about a central longitudinal axis not shown.

Figure 2:
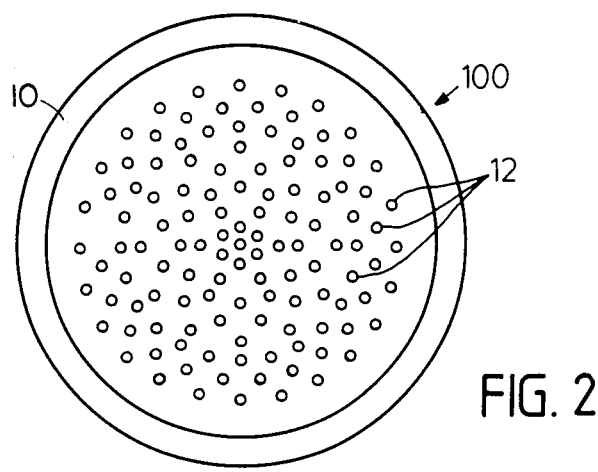
FIG. 2 is a view in the direction of the arrow A in FIG. 1, but showing only the front face of the main guiding plate.

FIG. 2 shows one possible arrangement of guide holes 12 in the main guide plate 10 of the guide and carrier unit 100. These holes 12 may be arranged, for example, in a raster pattern in a polar or rectangular coordinate system. The needles 11, 11' are primarily guided in these holes 12, whereby the longer needles 11' are additionally guided by the further guide plate 25.

Figure 3:
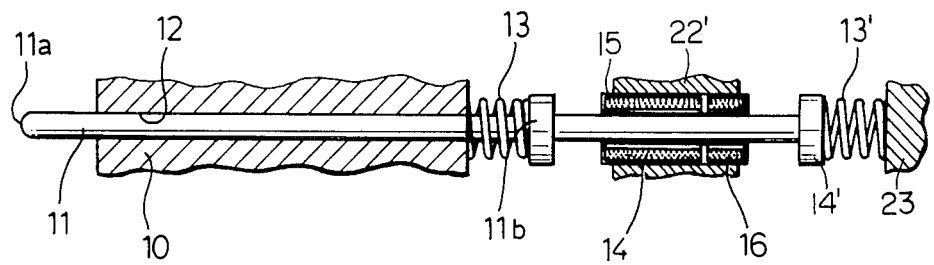
FIG. 3 is an enlarged sectional view through one peening needle and showing the details of the electromagnetic needle drive according to the invention.
Figure 5:
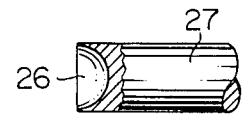
FIG. 5 shows, on an enlarged scale, a tool end of a modified peening needle as compared to FIG. 3.

As shown in FIG. 3, each of the needles may be provided with a tool end having at its tip the desired configuration, for example, in the form of a semispherical convex tip 11a. This structure may be achieved by welding a hardened steel ball to the needle tip. As shown in FIG. 5, a modified needle version 27 has a tool end with a semispherical concave depression 26. Depending on the type of work to be performed, different configurations may be provided for the tool ends of the needles. Needles with different tool ends may be combined in the same tool for performing particular types of work. Referring further to FIG. 3, each needle 11, 11' extends into a magnetic armature 14, whereby the needle proper is connected to the armature at a flange 11b of larger diameter for holding a first reset spring 13 between the main guide plate 10 and the flange 11b. The opposite end of the armature is also provided with a flange 14' for holding a further reset spring 13' between the flange 14' and the end plate 23. Each armature 14 is surrounded by the above mentioned electromagnetic drive coil 15 and the respective electromagnetic control coil 16. Both coils are mounted in the carrier ring 22', 22, see FIG. 1. Thus, each needle has its own drive coil 15 and its own control coil 16.

Figure 4:
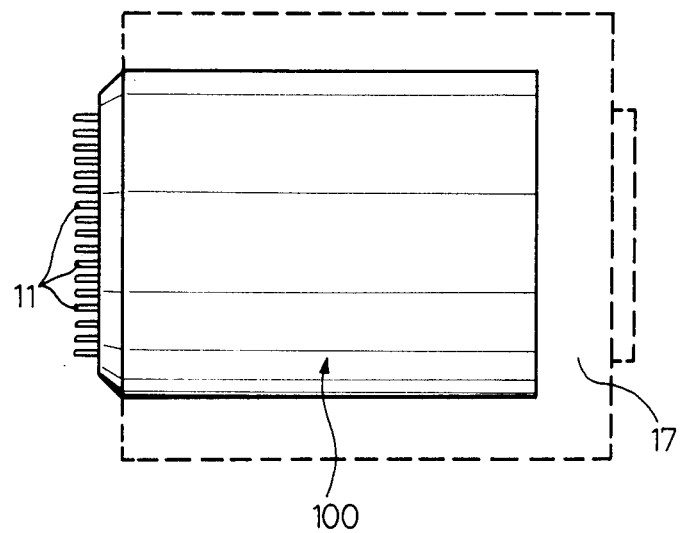
FIG. 4 shows schematically the cooperation of the drive means of the present peening tool with a drive control unit.
Figure 6:
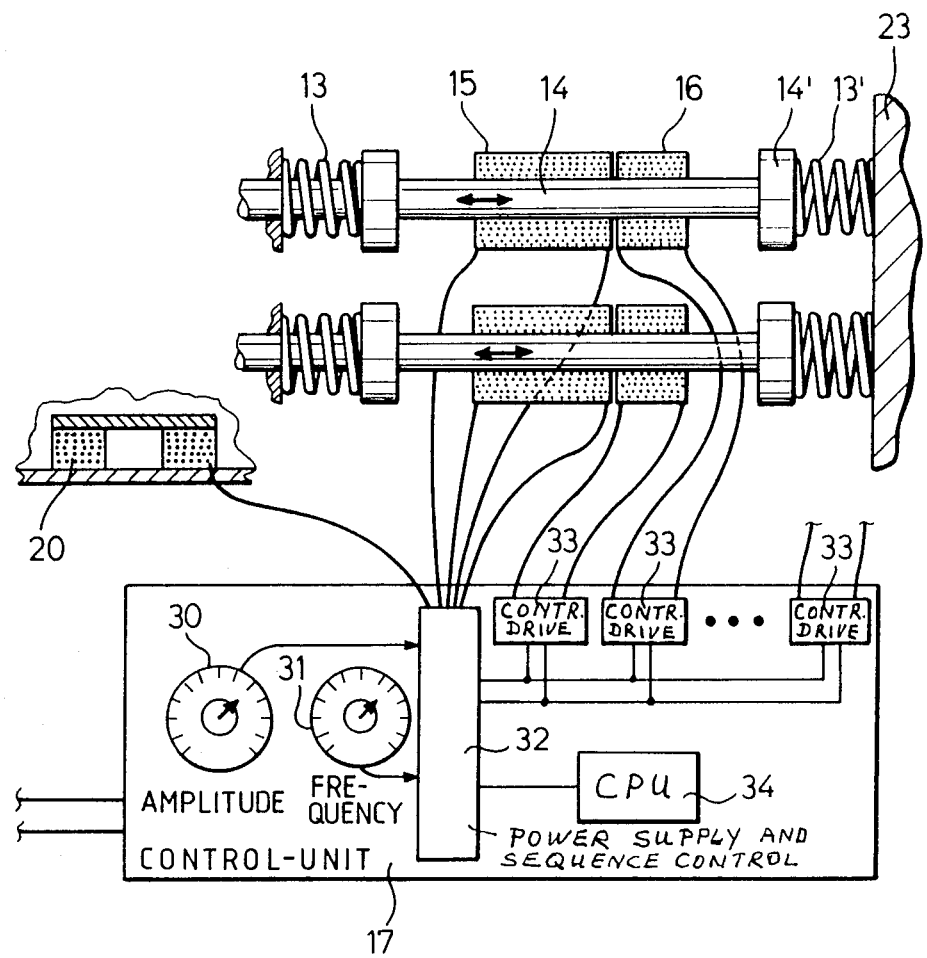
FIG. 6 shows the details of the present drive control unit for operating and driving the individual peening needles in accordance with a predetermined pattern or program.

FIG. 4 shows schematically a drive power supply control unit 17 which is disclosed in more detail in FIG. 6 and which generates the respective drive and control currents. Each magnetic drive coil 15 is connected by wires continuously to a respective power supply output of a power supply unit 32 providing an alternating drive current of a predetermined basic frequency to the corresponding magnetic drive coil 15. For convenience only two power supply outputs are shown in FIG. 6. However, the power supply unit 32 has one continuous power supply output for each drive coil 15.

The magnitude of this drive current and its frequency are adjustable by control means 30, 31 so that each steel needle 11, 11' is continuously driven with an adjustable amplitude and frequency back and forth in its longitudinal direction. Displacement to the left is reset by the spring 13 and displacement to the right is reset by the spring 13'. Both springs 13, 13' have a tendency to hold the armature 14 in the shown neutral position.

The power supply 32 also has sequence control output means connected to control drive power supplies 33, one of which is provided for each control coil 16.

By sequentially applying to the control coils 16 an energizing voltage having a frequency which is adjusted to correspond to the frequency of the drive current for the coils 15, the respective steel needle 11, 11' receives an additional impulse which is added to the work amplitude caused by the drive current applied to the respective coil 15, whereby the kinetic impact energy of the respective peening needle 11, 11' is increased in accordance with the energizing of the control coil 16. Thus, by varying the control voltage it becomes possible to control the impinging force or energy of the needles 11, 11'. The timed sequence of the needle operation is controlled, e.g., by a computer or central processing unit 34 for making sure that the control drive power supplies 33 are rendered effective in sequence, whereby a very exact control of the peening operation is possible. This control may be further modified by energizing the ring coils 20 mentioned above, whereby the pole rings 21, driven by the respective ring coils 20, cause an oscillatory displacement of the guide and carrier unit 100 and thus of the needles 11, 11' in directions approximately perpendicular to the longitudinal axis of the respective needle. The coils 20 are energized by circulating magnetic fields, whereby an optimal overlapping of the impinging surfaces of all the steel needles 11, 11' is assured. Thus, a very exact and detailed control of the needle impinging operation is obtained.

Under the control of the central processing unit or computer 34 the power supply control unit 17 makes it possible to control or energize the coils 15 and 16 individually and/or in any desired combination, whereby, depending on the required deformation of the piece of sheet metal the sequence and force of the individual needle impinging movements may be determined and selected. Thus, it is, for example, possible to cause a sequential operation of the needles in such a way that starting with the central needle shown in FIG. 2 the impinging action propagates much like an explosion from the center outwardly for the formation of a concave depression in the surface, whereby the depression has the shape of the concavity of a skull cap. Where a cylindrical deformation is to be achieved, the needles will be operated in a line by line fashion. Further, by selecting and arranging needles with different tool ends 11a and/or 26, it is even possible to form a wave type surface configuration. The possibilities of variation for any desired shape of a work piece and for any desired type of peening of the work piece are practically without limits due to the above described individualized control of each needle separately, but in coordination with the control of all the other needles. By providing a random function generator in the control unit 17 it is even possible to perform a peening operation corresponding to conventional shot peening.

Preferably, the housing 18 is secured to the arm of a conventional industrial robot, not shown, whereby it is possible to peen any desired work piece to any desired configuration in all directions of space because the present tool works independently of its instantaneous position. Further, the adjustability of the robot arm also provides for the exact adjustment of the feed advance of the tool. Thus, not only the mentioned deformation to any desired three-dimensional shape of a sheet metal work piece is possible, but also a surface hardening and densification.

Although the invention has been described with reference to specific example embodiments, it will be appreciated, that it is intended, to cover all modifications and equivalents within the scope of the appended claims.

What we claim is:

1. An electromagnetically operated peening tool, comprising housing means, a plurality of peening needles for work hardening a work piece surface, carrier means for movably supporting and guiding said peening needles in said housing means, electromagnetic drive means for operating said peening needles in a back and forth movement, each peening needle having its own magnetic needle armature for cooperation with said electromagnetic drive means, each peening needle further having a tool end extending out of said carrier means for impacting a work piece surface.

2. The tool of claim 1, wherein said electromagnetic drive means comprise an individual drive coil for cooperation with each respective needle armature, and an individual control coil arranged for cooperation with each respective drive coil to control the amplitude or stroke and frequency of each needle individually.

3. The tool of claim 2, wherein each needle armature has a cylindrical shape for sliding back and forth in its respective drive coil and in its respective control coil.

4. The tool of claim 2, further comprising drive control means operatively connected to said individual control coils for changing the voltages and frequencies applied to said individual control coils for individually controlling the impacting force or stroke of each individual peening needle and for controlling the operational sequence and frequency of peening needles in a variable and exact manner.

5. The tool of claim 1, wherein said carrier means comprise at least one guide plate with guide holes therein for individually supporting and guiding each peening needle, said guide holes being arranged in a predetermined pattern.

6. The tool of claim 5, wherein said predetermined hole pattern is a coordinate pattern.

7. The tool of claim 1, further comprising flexibly yielding mounting means for movably securing said carrier means in said housing means, and oscillation drive means operatively connected to said carrier means for oscillating said carrier means as a unit.

8. The tool of claim 7, wherein said carrier means comprise perforated plate means for guiding said peening needles, ring means interconnecting said perforated plate means, said oscillation drive means comprising electromagnetic ring drive coils arranged for cooperating with said ring means for vibrating said carrier means rotationally back and forth about a central axis.

9. The tool of claim 1, wherein said peening needles comprise at least two sets of needles, one needle set including longer needles, the other needle set including shorter needles as compared to said longer needles, said carrier means comprising two perforated guide plates, all needles extending through one of said guide plates, only the longer needles extending through both guide plates.

10. The tool of claim 1, wherein each peening needle comprises a magnetic armature, said tool further comprising two reset springs for each armature operatively connected between the respective armature and said carrier means for returning the respective peening needle into a neutral position after each drive stroke.

11. The tool of claim 1, wherein the tool end of each peening needle has a substantially semispherical convex shape.

12. The tool of claim 1, wherein the tool end of each peening needle has a substantially semispherical concave shape.

* * * * *